United States Patent Office 3,592,945
Patented July 13, 1971

3,592,945
SOFT-GELATINE CAPSULES WITH INCREASED HEAT RESISTANCE AND METHOD OF THEIR PRODUCTION
Christel Engelking, Pesch, near Cologne, Germany, assignor to A. Nattermann & Cie GmbH, Cologne-Braunsfeld, Germany
No Drawing. Filed Mar. 7, 1968, Ser. No. 711,228
Claims priority, application Germany, Mar. 7, 1967, N 30,128
Int. Cl. B01j *13/02;* A61k *9/04;* B44d *1/14*
U.S. Cl. 252—316                                   4 Claims

ABSTRACT OF THE DISCLOSURE

Described are soft-gelatine capsules with increased thermostability. The capsules are provided with a protective coating comprising a copolymer of methacrylic acid and methylmethacrylate whose acid number is between 180 and 350 and whose molecular weight is between 110,000 and 160,000. A softener such as dibutylphthalate and castor oil may be added. Also described is a process of preparing these capsules.

---

Soft-gelatine capsules because of the chemical and physical properties of gelatine have no stability against moisture and heat. As a result, during prolonged storage, the capsules may melt or stick together, particularly if the capsules also contain hygroscopic substances. An effective protection against moisture can be provided through appropriate packing. This, however, will not satisfactorily eliminate the influence of heat. Particularly in tropical climates one is faced with the unpleasant occurrence that the soft-gelatine cases are softened by heat despite excellent packing conditions. The individual capsules become glued to each other or to the wall of their container or they may even melt into one another resulting in a formless mass, whereby the cases, particularly at the seams, frequently burst open. Due to this phenomenon, soft-gelatine capsules cannot be considered for medications despite their many advantages, when used in tropical or sub-tropical regions.

It is known to coat gelatine capsules with silicon resins, so as to protect them from a direct influence of moisture or in order to prevent a penetration of atmospheric oxygen (Pharm. Ind. 1954, pages 418–420). Coatings of polyoxyethylenesorbitantristearate and paraffin, laurylsulfate and stearic acid, or comprised of a mixture of polyethyleneglycols, glycerine-mono and/or di-oleate and polyvinylacetate have been applied to gelatine rectal capsules, which have an emulsifying effect when inserted into the rectum, thereby making application easier (German published applications 1,116,867 and 1,181,863). This method, however, does not produce a heat stability in the gelatine capsules, particularly in soft-gelatine capsules.

It is an object of my invention to produce a coating, particularly for oral soft-gelatine capsules, which can provide the capsule casing with an adequate physical stability for the duration of increased temperatures while concurrently insulating said capsule casing against its surrounding so that the capsules can neither melt nor become glued together. These objects are to be obtained without impairing the favorable aspects of the gelatine capsules, especially their short break-up time in gastric juices. Other demands placed upon such casings must, of course, also be met. For example, the casings must be physiologically harmless, be effective in small amounts, have good temperature resistance, a certain elasticity and sufficient stability against mechanical stresses, have neither smell nor taste, speedy dissolving, and be suitable for mass production.

My invention achieves the above objects by providing the soft-gelatine capsules with a protective coating comprised of an anionic copolymer, if necessary, containing a softener, of methacrylic acid and methylmethacrylate whose acid number is between 180 and 350 and whose average molecular weight is approximately 110,000 to 160,000. The softener contained in the copolymer is preferably about 9% dibutylphthalate and if necessary contains between 12 and 26% castor oil. The methacrylic acid as well as the methylmethacrylate may, if necessary, be substituted either partly or fully by acrylic acid or acrylic acid ester. If necessary, small amounts of other monomers may be incorporated into the polymer without effecting important changes in the character of the ionic copolymer.

A preferred, anionic copolymer of methacrylic acid and methylmethacrylate has an acid number of between 270 and 310 and a molecular weight of about 135,000.

Other polymers of acrylic acid or acrylic acid derivatives as well as other polymeric substances, such as shellac, cellulose derivatives, polyvinylpyrrolidone, polyethyleneglycol, copolymers of polyvinylpyrrolidone and polyvinylacetate, silicon resins and the like, have been used for coating tablets and pills in order to make them resistant to gastric juices. This is to ensure that the medicines will not dissolve in the acid of the gastric juice, but will quickly dissolve in the alkaline intestinal juice, so that the effective substance will be initially released in the intestines (Pharm. Ind. 1960, pages 248–249 and 441–443). The use of these resins to protect against the effect of gastric juices is however a completely different matter and has nothing to do with the heat resistance of gelatine capsules. As will be shown infra, the other polymer substances have no or only a slight effect upon the characteristics of the gelatine capsules, with respect to heat, as may occur for example in tropical regions.

To produce the gelatine capsules of the present invention, the capsule may be coated in accordance with known methods, with a solution of the copolymer, followed by evaporation of the solvent. Extensive tests have shown that a coating of about 2 to 8 mg., computed as a solid substance, is sufficient for a capsule of standard size, i.e. 6 to 8 minim. A coating of 4 to 6 mg. per capsule is preferably applied. The coating may be applied manually in the pill kettle or by means of an automatic spraying device or by a fluidized bed process, using appropriate solvents. Isopropanol and ethanol are particularly well suited as solvents for the anionic copolymer. The evaporation of the solvent may favorably be accelerated by the injection of hot air, at a temperature of 40 to 60° C.

The present invention will be more specifically illustrated by the following example:

EXAMPLE 96,000 capsules of 8 minim capacity produced by the Scherer-Rotary-Die process were introduced into a conventional pill kettle of 90 cm. diameter. Thereafter 6,090 kg. of a 7.5% solution of a copolymer of methacrylic acid and methylmethacrylate with an acid number of 292, in isopropanol, which solution also contains 38 g. dibutylphthalate and 61 g. castor oil, were slowly sprayed by a spraying apparatus comprising a compressor and a spray gun on the capsules rolling within a rotating kettle. The amount of solvent applied was equal to the amount of solvent evaporating. The evaporation proces may be considerably accelerated by simultaneous injection of warm air at a temperature of approximately 50° C. This temperature is not enough to overheat the capsules. After the entire solution has been applied and the solvent evaporated off, the capsules are dried in the air. The time needed to produce the coating of the present invention on the capsules is approximately 30 to 45 minutes. The thin coating is now sufficiently hardened and the capsules may be packaged.

Provided the packaging is moisture tight, the capsules produced will withstand temperatures of +55° C. without sticking together, becoming soft or melting one into another. The capsules of the present invention are outwardly virtually unchanged, i.e. their coating is fully transparent and they break up in an artificial gastric juice within approximately 20 to 30 minutes, while the same uncoated capsules require a period of about 10 to 15 minutes for the same purpose. This slight delay in dissolving time, i.e. about 10 to 15 minutes, is negligible for the use of these capsules and their medicinal value.

The applied copolymer coating has neither odor nor taste while providing the capsules with the required temperature resistance for withstanding a tropical climate. Also, the coated capsules of my invention have the further advantage in that they are stabilized at their most sensitive spot, namely their seam lines. This further increases the mechanical stability of the capsule casing. Finally an undisturbed, very speedy packaging of the capsules is ensured in large-scale production due to the fact that the coating prevents the gelatine capsules from sticking together or adhering to the walls of the filling installation.

The advantages afforded by the present invention are the more surprising since out of all substances which have been used in the production of tablets and pills to form films with or without a resistance to gastric juices, only copolymers based upon polyacrylic acid derivatives have a heat-stabilizing effect upon soft-gelatine capsules. It is particularly surprising that such a thin film which is hardly perceptible on the outside, in the negligible amount of only a few milligrams per capsule, as applied in accordance with the present invention, lends such improved stability against the influence of heat and also provides a great mechanical stability. Though polyacrylic acid derivatives were previously applied as a coating for granules, tablets and pills, it appears as an even greater surprise that a homogeneous and tightly adhering film can be applied at all upon the entirely different surfaces of a soft-gelatine capsule, merely by an appropriate selection of the polyacrylic acid derivatives.

To illustrate the difficulties associated with the discovery of the copolymers of the present invention and to provide a clear illustration of the surprise effect which was obtained wtih these copolymers, a series of tests conducted with other polymers is given which were previously used to produce coatings for tablets and pills, with and without a resistance effect against gastric juices and which in view of my invention might have also been expected to have a heat-resisting effect on gelatine capsules. In all cases, 5 mg. of coating were applied per capsule in the same manner as described in the example. These tests lead to the following results:

(a) No homogeneous film can be formed with ethyl cellulose (20 cp.). Ethyl cellulose adheres in shreds to the capsule surface. The capsules are, furthermore, unsightly and the heat test conducted at 45 and 60° C. does not point to a stabilizing effect due to the applied coating.

(b) Ethyl cellulose (7 cp.) showed the same results as test (a).

(c) Though a homogeneous, transparent film can be provided with polyvinylpyrrolidone (Collidon 25), the capsules begin to stick together even at room temperature and to adhere to the wall of the container. The heat test shows no stabilizing effect, but rather a worsening of conditions.

(d) No homogeneous film could be applied on a gelatine surface with the aid of celluloseacetatephthalate. Numerous, greyish-white spots form on the capsule surface which give the capsule an unsightly appearance. The heat test did not yield a stabilizing effect.

(e) Polyethylene glycol (HM-50; melting point approximately 62° C.) yielded, during the application, a greyish-white, waxy, nonhomogeneous layer which did not adhere tightly to the gelatine coating. The treated capsules were unsightly and the heat test did not yield a stabilizing effect.

(f) A mixture of 1 part ethylcellulose and 3 parts methyl cellulose did not produce a homogeneous film, but rather produced greyish-white blotches forming on the surface of the capsules and making them unsightly. No stabilizing effect was derived during heat tests.

(g) A homogeneous, transparent film was obtained with a mixed polymer of polyvinylpyrrolidone and polyvinylacetate (trade name Luviskol VA 64), whereby the surface of the coated capsules was shiny. But even at room temperature the capsules stuck to each other and to the wall of the container. The heat test shows no stabilizing effect.

(h) A mixed polymer of methacrylic acid and methylmethacrylate (obtainable under the trade name Eudragit S) containing an acid number of approximately 178 and an average molecular weight of about 135,000 produced homogeneous, transparent film on the capsules but the heat test showed only a negligible stabilizing effect.

(i) A mixed polymer of methacrylic acid and methylmethacrylate (obtainable under the trademark Eudragit E), which contains acid number of about 180 and a molecular weight of approximately 130,000 resulted in an homogeneous, transparent film for the capsules, but the heat test did not produce any stabilizing effect.

On the basis of the above tests it was concluded that out of the numerous polymeric substances used by the drug industry to produce films for medications only the copolymer of the present invention comprised of methacrylic acid and methylmethacrylate, whose acid number is between 180 and 350, produces a considerable heat stability effect upon soft-gelatine capsules. It is assumed that the correlation of the acid groups of the copolymer with the amino groups of the gelatine is of importance for the desired effect and that this results in a tight binding and changes the properties of the gelatine surface. It thus suffices to apply only a thin coating upon the gelatine capsules, in order to obtain this effect.

A minim is a unit of volume equal to one-sixtieth part of a fluid dram.

I claim:

1. Soft-gelatine capsule with increased heat-stability having a protective coating consisting essentialy of a copolymer consisting of methacrylic acid and methylmethacrylate, with an acid number between 180 and 350 and molecular weight between 110,000 and 160,000, said coating containing about 9% dibutylphthalate and about 12 to 26% castor oil based on the copolymer.

2. The soft-gelatine capsule of claim 1, wherein the copolymer has an acid number between 270 and 310.

3. The method of producing a soft-gelatine capsule with increased heat stability having a protective coating consisting essentially of a copolymer consisting of methacrylic acid and methylmethacrylic, with an acid number between 180 and 350 and molecular weight between 110,000 and 160,000, said coating containing about 9% dibutylphthalate and about 12 to 26% castor oil based on the copolymer, wherein the copolymer, the dibutylphthalate and the castor oil are dissolved in isopropanol or ethanol, the capsules are then coated with this solution, and the solvent is then removed by injecting hot air at a temperature of 40 to 60° C. to produce a coating containing approximately 2 to 8 mg. of dry substance per 8 minim capsule.

4. The method of claim 3, wherein a coating of 4 to 6 mg. per gelatine capsule is applied.

References Cited

UNITED STATES PATENTS

| | | | |
|---|---|---|---|
| 2,512,192 | 6/1950 | Yen et al. | 424—32 |
| 3,016,308 | 1/1962 | Macaulay | 252—316X |
| 3,043,782 | 7/1962 | Jensen | 252—316 |
| 3,073,748 | 1/1963 | Utsumi et al. | 117—100X |
| 3,132,074 | 5/1964 | Svedres | 117—100X |
| 3,415,758 | 12/1968 | Powell et al. | 262—316 |

RICHARD D. LOVERING, Primary Examiner

U.S. Cl. X.R.

117—72, 100; 424—33, 37